June 10, 1930.      C. L. MATTISON      1,763,244
LATCH DEVICE
Filed Nov. 11, 1926
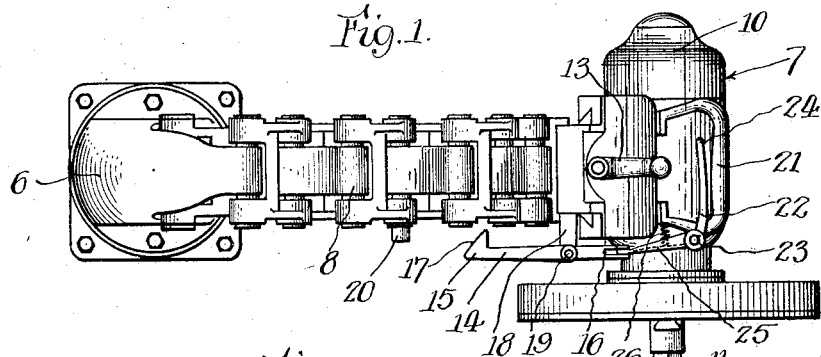
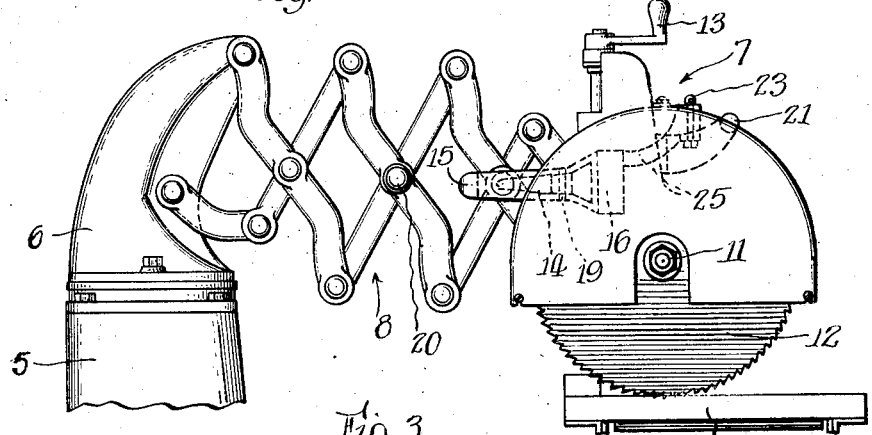
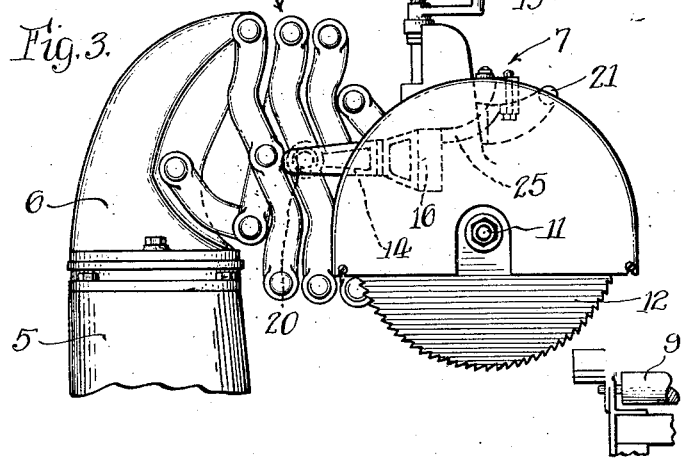
Inventor:
Carl Lawrence Mattison Patented June 10, 1930

1,763,244

UNITED STATES PATENT OFFICE

CARL LAWRENCE MATTISON, OF ROCKFORD, ILLINOIS, ASSIGNOR TO MATTISON MACHINE WORKS, OF ROCKFORD, ILLINOIS, A CORPORATION OF ILLINOIS

LATCH DEVICE

Application filed November 11, 1926. Serial No. 147,713.

This invention relates generally to a power driven saw and is more particularly pertinent to that type of woodworking machinery usually designated as a cut-off saw. This invention has reference to that disclosed in my Patent 1,707,764, granted April 2, 1929.

In the type of woodworking machine disclosed in the above mentioned copending application, a saw assembly is supported for reciprocal travel relative to a work table. It has been found necessary to prevent any accidental reciprocal movement of the saw assembly as such travel thereof is conducive to accidents and it is therefore an object of this invention to provide a means for holding a saw assembly against accidental travel.

A more specific object of this invention is to provide a latch for a saw assembly of this general character, said latch being arranged automatically to engage and hold the saw in a retracted position.

A further object is to provide a latch which is exceedingly simple in operation and in which the latch releasing means is most conveniently situated for the operator.

Other objects and advantages will become apparent from the following detailed description and in the accompanying drawings, in which:

Figure 1 is a plan view of the upper end of a woodworking machine showing the preferred form of the invention installed thereon.

Fig. 2 is a side elevation of the same showing the latch disengaged.

Fig. 3 is a similar view except that the latch is in its engaged position.

The device shown in the drawings, however, is merely an exemplary embodiment of the invention for the purpose of explaining the nature and application of the invention and it is not to be construed as limiting the invention to the particular construction set forth. It is further to be understood that the invention contemplates such other embodiments, modifications, and alternative constructions as fall within the scope of the appended claims.

The woodworking machine depicted in the drawings comprises a pedestal 5 having a bracket 6 mounted upon its upper end. A motor driven saw assembly designated generally as 7 is suspended from the bracket 6 for lateral reciprocal movement relative thereto, such suspension being shown herein as an extensible frame or lazy-tongs 8. The reciprocal movement provided by this means of supporting the saw assembly permits the assembly to be moved transversely of the bed of a work table 9.

The saw head assembly 7 comprises generally a housing 10 which encloses a suitable motor for driving a saw arbor 11 and saw blade 12, and is preferably mounted for vertical adjustment upon the free end of the extensible frame 8. Such vertical adjustment is regulated by a suitable rotatable operating handle 13. Thus far, the construction and arrangement of parts, and the mode of operation thereof, is similar to that disclosed at length in my copending application above mentioned.

Excepting when the saw assembly is being moved outwardly from the bracket to make a cut, the parts are normally at rest in retracted position, as shown in Fig. 3. Vibration of the machine, the rebound from pushing the saw assembly into retracted position, or the accidental striking of the assembly is liable to cause it to move out of retracted position and to travel outwardly across the table, thereby damaging the work or injuring the operator. I have provided therefore an automatic device adapted to retain the assembly in retracted position until released by the operator.

As depicted in the drawings the preferred form of the device comprises a latch including an engaging member pivotally mounted on the free end of the extensible frame and a trigger member mounted upon the vertically adjustable housing, said trigger member having an engagement with said engaging member to operate the latter. The engaging member in its preferred form comprises a bar 14 having at one end a hook 15 and in the other end a slot 16 extending the width thereof. An inclined contact surface 17 is provided on the hook 15. The bar 14 is pivoted intermediate its ends on an extension 18 rigid with the free end of the extensible frame 8 as by means of a pivot pin 19, in such manner that the hook end of the bar extends rearwardly along the sides of the extensible frame. A lug 20, preferably secured to one of the frame members is adapted to engage the hook 15 when the frame is in retracted position.

For the convenience of the operator in drawing the assembly across the table and return, a handle 21 is rigidly mounted on the housing 7. A trigger member in the form of a bell crank 22 suitably pivoted upon one side of the handle 21, as by a pivot pin 23, has one arm 24 extending along the hand piece of the handle, and the other arm 25 extending rearwardly to engage in the slot 16 in the end of the bar 14. The slotted end of the bar 14 is preferably of sufficient width so that the slot 16 may be long enough to permit the engaging arm of the trigger member 22 to slide therein without disengagement throughout the range of vertical adjustment of the housing 7.

A spring 26 arranged to bear outwardly against the arm 25 acts through the engagement of said arm with the bar 14 to hold the hook 15 in a position to engage the lug 20 and retain such engagement until positively released.

In operation, the assembly being in retracted position, an operator desiring to move the saw 12 across the work table 9, grasps the handle 21 and at the same time the trigger 24. Movement of the trigger against the force of the spring 26 moves the hook 15 outwardly to disengage said hook from the lug 20, thereby allowing the saw to be drawn forward. Upon the return movement of the saw to retracted position the surface 17 on the hook 15 rides over the lug 20 and the hook is snapped into positive engagement with the lug to hold the saw in its out-of-the-way position.

It will be readily apparent from the foregoing that in attaining the objects of the invention I have provided a simple and effective latching means, easily accessible for operation by the operator, and acting positively to hold the saw in its retracted position.

I claim as my invention:

1. A wood-working machine comprising, in combination, a stationary support, an extensible frame having one end mounted on said support, a motor driven tool head mounted on the free end of the extensible frame and carried thereby for horizontal reciprocatory movement, which movement is free and uninterrupted when said frame is in any position except fully retracted, a horizontal operating handle on said tool head, a latch device for holding said tool head in its fully retracted position, and a releasing lever for said latch device positioned adjacent said operating handle and arranged automatically to release said latch device when an operator grasps said operating handle and pulls forwardly thereon.

2. A wood-working machine saw comprising, in combination, a stationary support, an extensible frame having one end mounted on said support, a motor driven tool head mounted on the free end of the extensible frame and carried thereby for horizontal reciprocatory movement, which movement is free and uninterrupted when said frame is in any position except fully retracted, an operating handle on said tool head, and means for automatically latching said tool head in its fully retracted position, said means having a part forming a portion of said operating handle which automatically releases said latching means when the operating handle is grasped and pulled forwardly.

3. A cut-off saw comprising, in combination, a stationary support, an extensible frame having one end mounted on said support, a motor driven saw head mounted on the free end of the extensible frame and carried thereby for horizontal reciprocatory movement, which movement is free and uninterrupted when said frame is in any position except fully retracted, an operating handle on said saw head having a horizontally positioned grip portion, and means for holding said saw head in its fully retracted position comprising a latch device and an operating member for said latch device extending alongside of and to the rear of the grip portion of the saw head operating handle so that when an operator pulls forwardly on said operating handle his fingers engage said member and release said latch device.

4. A sawing machine comprising, in combination, a stationary support, an extensible frame having one end mounted on said support, a motor driven saw head mounted on the free end of the extensible frame and carried thereby for horizontal reciprocatory movement, which movement is free and uninterrupted when said frame is in any position except fully retracted, means for adjusting said saw head vertically on said frame, an operating handle mounted on said saw head for moving the latter horizontally, a latch device for holding said head in its fully retracted position comprising a latch releasing lever mounted on said saw head adjacent said operating handle, a catch for the latch mounted on another part of the machine, and means intermediate said lever and catch arranged to release the latch device upon manual movement of said lever, and operable in any position of vertical adjustment of said head.

5. A cut-off saw comprising, in combination, a stationary support, an extensible frame having one end mounted on said support, a motor driven saw head mounted on the free end of the extensible frame and carried thereby for horizontal reciprocatory movement, which movement is free and uninterrupted when said frame is in any position except fully retracted, means for adjusting said saw head vertically on said frame, an operating handle mounted on said saw head for moving the latter horizontally, a latch device mounted on said frame for holding said head in its fully retracted position, and a latch releasing lever mounted adjacent to and adapted to be grasped with said operating handle and having a vertical sliding connection with said latch device to permit operation of the latch device by the lever in any position of vertical adjustment of said saw head.

In testimony whereof I have hereunto affixed my signature.

CARL LAWRENCE MATTISON.

CERTIFICATE OF CORRECTION.

Patent No. 1,763,244.  Granted June 10, 1930, to

CARL LAWRENCE MATTISON.

It is hereby certified that error appears in the printed specification of the above numbered patent requiring correction as follows: Page 2, line 69, claim 2, strike out the word "saw"; and that the said Letters Patent should be read with this correction therein that the same may conform to the record of the case in the Patent Office.

Signed and sealed this 22nd day of July, A. D. 1930.

(Seal)

Wm. A. Kinnan,
Acting Commissioner of Patents.